(12) United States Patent
Dellock et al.

(10) Patent No.: US 9,688,186 B2
(45) Date of Patent: Jun. 27, 2017

(54) ILLUMINATING DECAL FOR A VEHICLE

(71) Applicant: Ford Global Technologies, LLC, Dearborn, MI (US)

(72) Inventors: Paul Kenneth Dellock, Northville, MI (US); Stuart C. Salter, White Lake, MI (US); Cornel Lewis Gardner, Romulus, MI (US); Michael A. Musleh, Canton, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/686,156

(22) Filed: Apr. 14, 2015

(65) Prior Publication Data

US 2015/0217681 A1    Aug. 6, 2015

Related U.S. Application Data

(63) Continuation-in-part of application No. 14/603,636, filed on Jan. 23, 2015, which is a continuation-in-part of application No. 14/086,442, filed on Nov. 21, 2013.

(51) Int. Cl.
| | |
|---|---|
| *F21V 11/00* | (2015.01) |
| *B60Q 1/26* | (2006.01) |
| *B60R 13/04* | (2006.01) |
| *H05B 37/02* | (2006.01) |
| *B60Q 1/32* | (2006.01) |

(52) U.S. Cl.
CPC ............ *B60Q 1/2696* (2013.01); *B60Q 1/26* (2013.01); *B60Q 1/323* (2013.01); *B60R 13/04* (2013.01); *H05B 37/0218* (2013.01); *H05B 37/0227* (2013.01); *B60Q 2400/20* (2013.01); *Y02B 20/46* (2013.01)

(58) Field of Classification Search
CPC ...... B60Q 1/2669; B60Q 1/323; B60R 13/00; B60R 13/005; B60R 13/02; B60R 13/04; G09F 21/04
USPC .................................................. 362/459–549
See application file for complete search history.

(56) References Cited

U.S. PATENT DOCUMENTS

| | | | |
|---|---|---|---|
| 5,053,930 A | | 10/1991 | Benavides |
| 5,566,384 A | * | 10/1996 | Chien ...................... B60Q 1/30 |
| | | | 362/276 |
| 5,709,453 A | | 1/1998 | Krent et al. |
| 5,839,718 A | | 11/1998 | Hase et al. |
| 6,031,511 A | | 2/2000 | DeLuca et al. |
| 6,117,362 A | | 9/2000 | Yen et al. |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — William Carter
(74) *Attorney, Agent, or Firm* — Jason Rogers; Price Heneveld LLP

(57) ABSTRACT

A decal for a vehicle is provided herein. The decal includes a plurality of light sources and a photoluminescent structure configured to luminesce in response to excitation by at least a portion of the light sources. A decorative layer has a pattern that is at least partially illuminated by the photoluminescent structure when the photoluminescent structure is in luminescent state is provided.

19 Claims, 5 Drawing Sheets

(56) References Cited

U.S. PATENT DOCUMENTS

| | | |
|---|---|---|
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,065,910 B2 | 6/2006 | Woodruff |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,264,366 B2 | 9/2007 | Hulse |
| 7,264,367 B2 | 9/2007 | Hulse |
| 7,330,102 B2 | 2/2008 | Fletcher |
| 7,441,914 B2 | 10/2008 | Palmer et al. |
| 7,488,432 B2 | 2/2009 | Murazaki et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,264,138 B2 | 9/2012 | Negley et al. |
| 8,286,378 B2 | 10/2012 | Martin et al. |
| 8,408,766 B2 | 4/2013 | Wilson et al. |
| 8,408,773 B2 | 4/2013 | Judge |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,511,884 B2 | 8/2013 | Donahue |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2004/0264166 A1* | 12/2004 | Chien ................ B60R 11/00 362/84 |
| 2005/0068783 A1 | 3/2005 | Egashira et al. |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0225545 A1* | 9/2008 | Seidler ............ B60Q 3/0243 362/546 |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0103321 A1 | 4/2014 | Furukawa et al. |
| 2014/0211498 A1* | 7/2014 | Cannon ............. B60Q 3/002 362/555 |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0236613 A1 | 8/2016 | Trier |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2546218 A1 | 1/2013 |
| EP | 2746043 A1 | 6/2014 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |

* cited by examiner

ILLUMINATING DECAL FOR A VEHICLE

CROSS-REFERENCE TO THE RELATED APPLICATIONS

This application is a continuation-in-part of U.S. patent application Ser. No. 14/603,636, filed Jan. 23, 2015, entitled "DOOR ILLUMINATION AND WARNING SYSTEM," which is a continuation-in-part of U.S. patent application Ser. No. 14/086,442, filed Nov. 21, 2013, entitled "VEHICLE LIGHTING SYSTEM WITH PHOTOLUMINESCENT STRUCTURE." The aforementioned related applications are hereby incorporated by reference in their entirety.

FIELD OF THE INVENTION

The present invention generally relates to vehicle lighting systems and more particularly relates to vehicle lighting systems employing photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a decal for a vehicle is provided. The decal includes a plurality of light sources and a photoluminescent structure configured to luminesce in response to excitation by at least a portion of the light sources. A decorative layer has a pattern that is at least partially illuminated by the photoluminescent structure when the photoluminescent structure is in luminescent state is provided.

According to another aspect of the present invention, a decal for a vehicle is provided. The decal includes a plurality of light sources adhered to a vehicle surface. A photoluminescent structure is arranged over the light sources and is configured to luminesce in response to excitation by at least a portion of the light sources. A decorative layer is arranged over the photoluminescent structure and has a pattern that is at least partially illuminated by the photoluminescent structure when the photoluminescent structure is in a luminescent state.

According to yet another aspect of the present invention, a decal for a vehicle is provided. A plurality of printed LEDs are adhered to a vehicle surface. A photoluminescent structure is arranged over the printed LEDs and is configured to luminesce in response to excitation by at least a portion of the printed LEDs. A decorative layer is arranged over the photoluminescent structure and has a pattern that is at least partially illuminated by the photoluminescent structure when the photoluminescent structure is in a luminescent state.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a decal adapted to be received on a vehicle. The decal includes a light-producing assembly and at least one photoluminescent structure configured to luminesce in response to excitation from the light-producing assembly. When excited, the photoluminescent structure illuminates at least a portion of a decorative layer of the decal in one or more colors. While the following disclosure is directed to automobile lighting applications, it should be appreciated that the teachings provided herein may be similarly applied to lighting applications of other types of vehicles designed to transport one or more passengers such as, but not limited to, aircraft, watercraft, trains, and all-terrain vehicles (ATVs).

Figure 1:
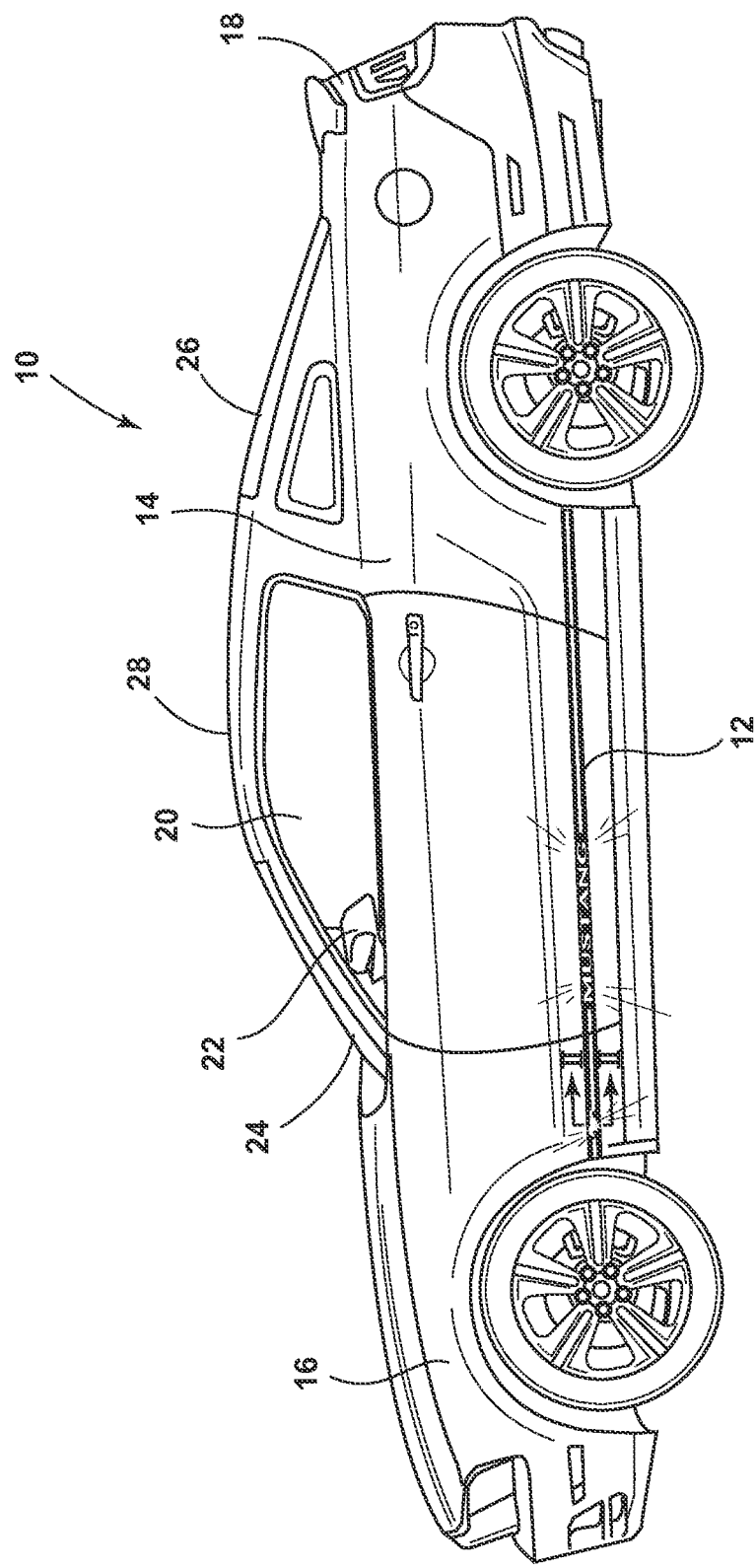
FIG. 1 is a side view of a vehicle having an decal capable of illuminating, according to one embodiment.

Referring to FIG. 1, the exterior of a vehicle 10 is generally shown according to one embodiment. As shown, a decal 12 is arranged over a side body 14 of the vehicle 10. The decal 12 is exemplarily patterned as a horse and accompanying text, at least a portion of which is adapted to illuminate in response to a vehicle-related condition. It should be appreciated that the decal location is not limited to that depicted in FIG. 1, and may include other locations on the side body 14, front body 16, and rear body 18 of the vehicle 10. It is also contemplated that the decal 12 may be arranged over a portion of a window 20, side mirror assembly 22, front windshield 24, rear windshield 26, and roof structure 28 of the vehicle 10. Furthermore, it is contemplated that the decal 12 may be arranged in other sizes, shapes, and/or patterns, and may be applied to linear and/or non-linear surfaces of the vehicle 10.

Figure 2:
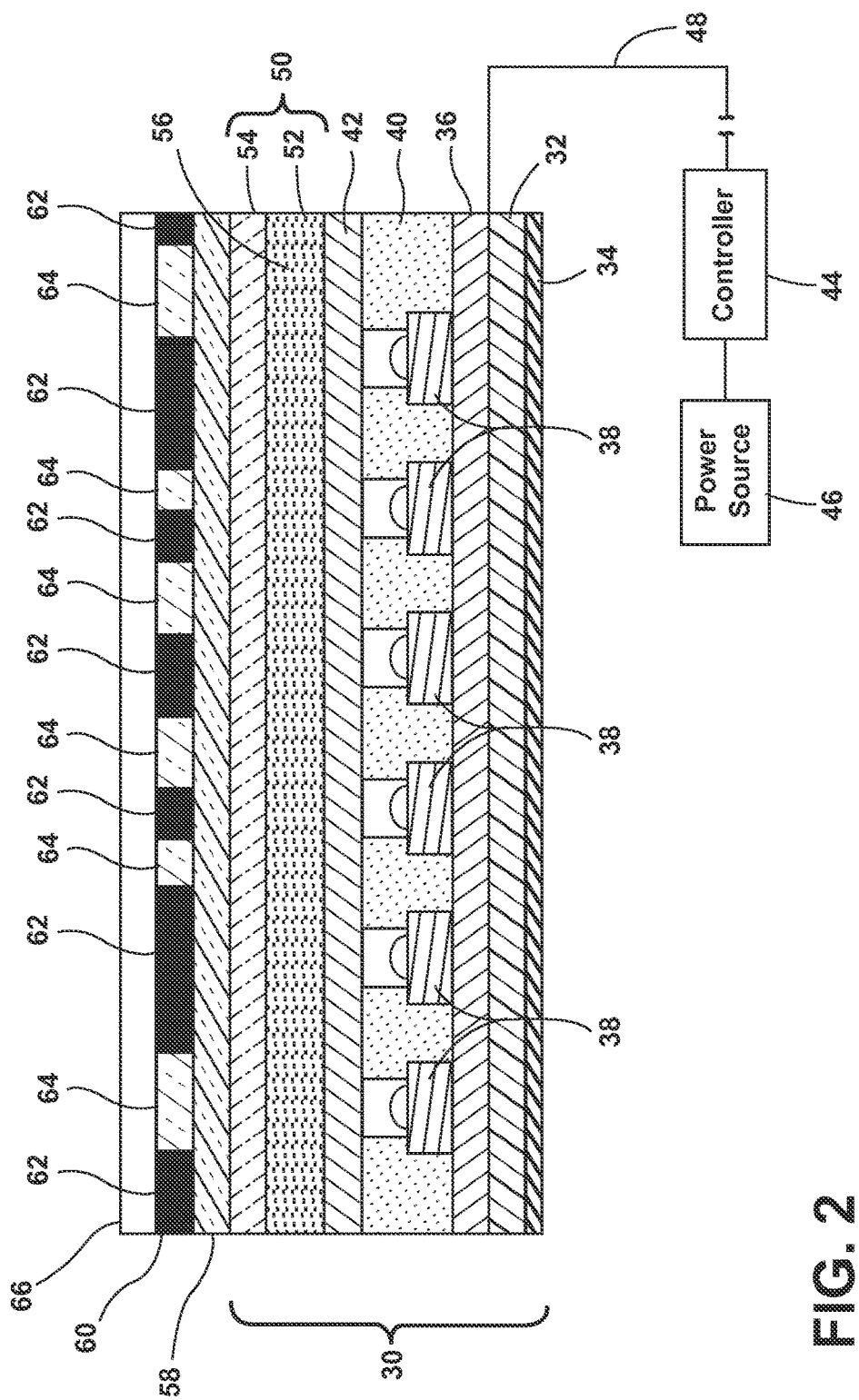
FIG. 2 is cross-sectional view of a decal taken along lines II-II of FIG. 1.

Referring to FIG. 2, a cross-sectional view of the decal 12 depicted in FIG. 1 is shown according to one embodiment. As illustrated in FIG. 2, the decal 12 may have a stacked arrangement and includes a light-producing assembly 30 corresponding to a thin-film or printed light emitting diode (LED) assembly. The light-producing assembly 30 includes a substrate 32 arranged over an adhesive layer 34 for affixing the decal 12 to the vehicle 10. The substrate 32 may include a polycarbonate, poly-methyl methacrylate (PMMA), or polyethylene terephthalate (PET) material on the order of 0.005 to 0.060 inches thick. A positive electrode 36 is arranged over the substrate 32 and includes a conductive epoxy such as, but not limited to, a silver-containing or copper-containing epoxy. The positive electrode 36 is electrically connected to at least a portion of a plurality of LED sources 38 arranged within a semiconductor ink 40 and applied over the positive electrode 36. Likewise, a negative electrode 42 is also electrically connected to at least a portion of the LED sources 38. The negative electrode 42 is arranged over the semiconductor ink 40 and includes a transparent or translucent conductive material such as, but not limited to, indium tin oxide. Additionally, each of the positive and negative electrodes 36, 42 are electrically connected to a controller 44 and a power source 46 via one or more wirings 48. The controller 44 may be variously located in the vehicle 10 and the power source 46 may correspond to a vehicular power source operating at 12 to 16 VDC. The one or more wirings 48 may be wired through the frame of the intended portion of the vehicle 10 (e.g., side body 14) on which the decal 12 is to be received.

The LED sources 38 may be dispersed in a random or controlled fashion within the semiconductor ink 40 and may be configured to emit focused or non-focused light. The LED sources 38 may correspond to micro-LEDs of gallium nitride elements on the order of 5 to 400 microns in size and the semiconductor ink 40 may include various binders and dielectric material including, but not limited to, one or more of gallium, indium, silicon carbide, phosphorous, and/or translucent polymeric binders. In this manner, the semiconductor ink 40 may contain various concentrations of LED sources 38 such that the density of the LED sources 38 may be adjusted for various lighting applications. In some embodiments, the LED sources 38 and semiconductor ink 40 may be sourced from Nth Degree Technologies Worldwide Inc. The semiconductor ink 40 can be applied through various printing processes, including ink jet and silk screen processes to selected portion(s) of the positive electrode 36. More specifically, it is envisioned that the LED sources 38 are dispersed within the semiconductor ink 40, and shaped and sized such that a substantial quantity of them align with the positive and negative electrodes 36, 42 during deposition of the semiconductor ink 40. The portion of the LED sources 38 that ultimately are electrically connected to the positive and negative electrodes 36, 42 may be illuminated by a combination of the controller 44, power source 46, and the one or more wirings 48. Additional information regarding the construction of light-producing assemblies is disclosed in U.S. Patent Publication No. 2014-0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

Referring still to FIG. 2, a photoluminescent structure 50 is arranged over the negative electrode 42 as a coating, layer, film or other suitable deposition. With respect to the presently illustrated embodiment, the photoluminescent structure 50 may be arranged as a multi-layered structure including an energy conversion layer 52 and an optional stability layer 54. The energy conversion layer 52 includes at least one photoluminescent material 56 having energy converting elements with phosphorescent or fluorescent properties. For example, the photoluminescent material 56 may include organic or inorganic fluorescent dyes including rylenes, xanthenes, porphyrins, phthalocyanines. Additionally or alternatively, the photoluminescent material 56 may include phosphors from the group of Ce-doped garnets such as YAG:Ce. The energy conversion layer 52 may be prepared by dispersing the photoluminescent material 56 in a polymer matrix to form a homogenous mixture using a variety of methods. Such methods may include preparing the energy conversion layer 52 from a formulation in a liquid carrier medium and coating the energy conversion layer 52 to the negative electrode 42 or other desired substrate. The energy conversion layer 52 may be applied to the negative electrode 42 by painting, screen printing, flexography, spraying, slot coating, dip coating, roller coating, and bar coating. Alternatively, the energy conversion layer 52 may be prepared by methods that do not use a liquid carrier medium. For example, the energy conversion layer 52 may be rendered by dispersing the photoluminescent material 56 into a solid state solution (homogenous mixture in a dry state) that may be incorporated in a polymer matrix formed by extrusion, injection molding, compression molding, calendaring, thermoforming, etc.

To protect the photoluminescent material 56 contained within the energy conversion layer 52 from photolytic and thermal degradation, the photoluminescent structure 50 may include a stability layer 54. The stability layer 54 may be configured as a separate layer optically coupled and adhered to the energy conversion layer 52 or otherwise integrated therewith. The stability layer 54 may be combined with the energy conversion layer 52 through sequential coating or printing of each layer, sequential lamination or embossing, or any other suitable means. Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference.

In operation, the photoluminescent material 56 is formulated to become excited upon receiving inputted light of a specific wavelength from at least a portion of the LED sources 38 of the light-producing assembly 30. As a result, the inputted light undergoes an energy conversion process and is re-emitted at a different wavelength. According to one embodiment, the photoluminescent material 56 may be formulated to convert inputted light into a longer wavelength light, otherwise known as down conversion. Alternatively, the photoluminescent material 56 may be formulated to convert inputted light into a shorter wavelength light, otherwise known as up conversion. Under either approach, light converted by the photoluminescent material 56 may be immediately outputted from the photoluminescent structure 50 or otherwise used in an energy cascade, wherein the converted light serves as inputted light to excite another formulation of photoluminescent material located within the energy conversion layer 52, whereby the subsequent converted light may then be outputted from the photoluminescent structure 50 or used as inputted light, and so on. With respect to the energy conversion processes described herein, the difference in wavelength between the inputted light and the converted light is known as the Stokes shift and serves as the principle driving mechanism for an energy conversion process corresponding to a change in wavelength of light.

With continued reference to FIG. 2, an adhesive layer 58 is arranged over the photoluminescent structure 50. The adhesive layer 58 may be a substantially transparent plastic film optically coupled and adhered to the photoluminescent structure 50 to create a substrate on which to print a decorative layer 60 via silk screen, ink jet, or other printing processes. The decorative layer 60 is arranged as a pattern using an opaque ink 62 and a translucent ink 64. Alternatively, instead of providing the decorative layer 60, the photoluminescent structure 50 may be arranged in the desired pattern and/or the LED sources 38 may be printed to only excite desired areas of the photoluminescent structure 50. A protection layer 66 is optically coupled and adhered to the decorative layer 60 to protect the decal 12 from physical and chemical damage arising from environmental exposure. The protection layer 66 may be arranged using sealing materials that are scratch resistant and provide ultraviolet (UV) shielding.

When applying the protection layer 66, it is beneficial to use low temperature and low pressure processing to prevent damage to the photoluminescent structure 50 and/or the light-producing assembly 30. For example, the protection layer 66 may be arranged as an ultraviolet (UV) or low-temperature curable silicone that is molded over the decorative layer 60. Alternatively, the protection layer 66 may include epoxies, urethanes, or other clear plastics arranged as a film or other suitable deposition.

In operation, the portions of the decorative layer 60 defined by the translucent ink 64 become illuminated by the photoluminescent structure 50 whenever an energy conversion process is underway whereas the portions of the decorative layer 60 defined by the opaque ink 62 function to outline certain details of the pattern by blocking light outputted by the photoluminescent structure 50. For example, the darkened areas of the decal 12 depicted in FIG. 1 may be defined using opaque ink 62 and the undarkened areas of the decal 12 may be defined using translucent ink 64. Thus, when an energy conversion process occurs, only the undarkened areas illuminate to showcase the corresponding graphics of the horse pattern.

Figure 3:
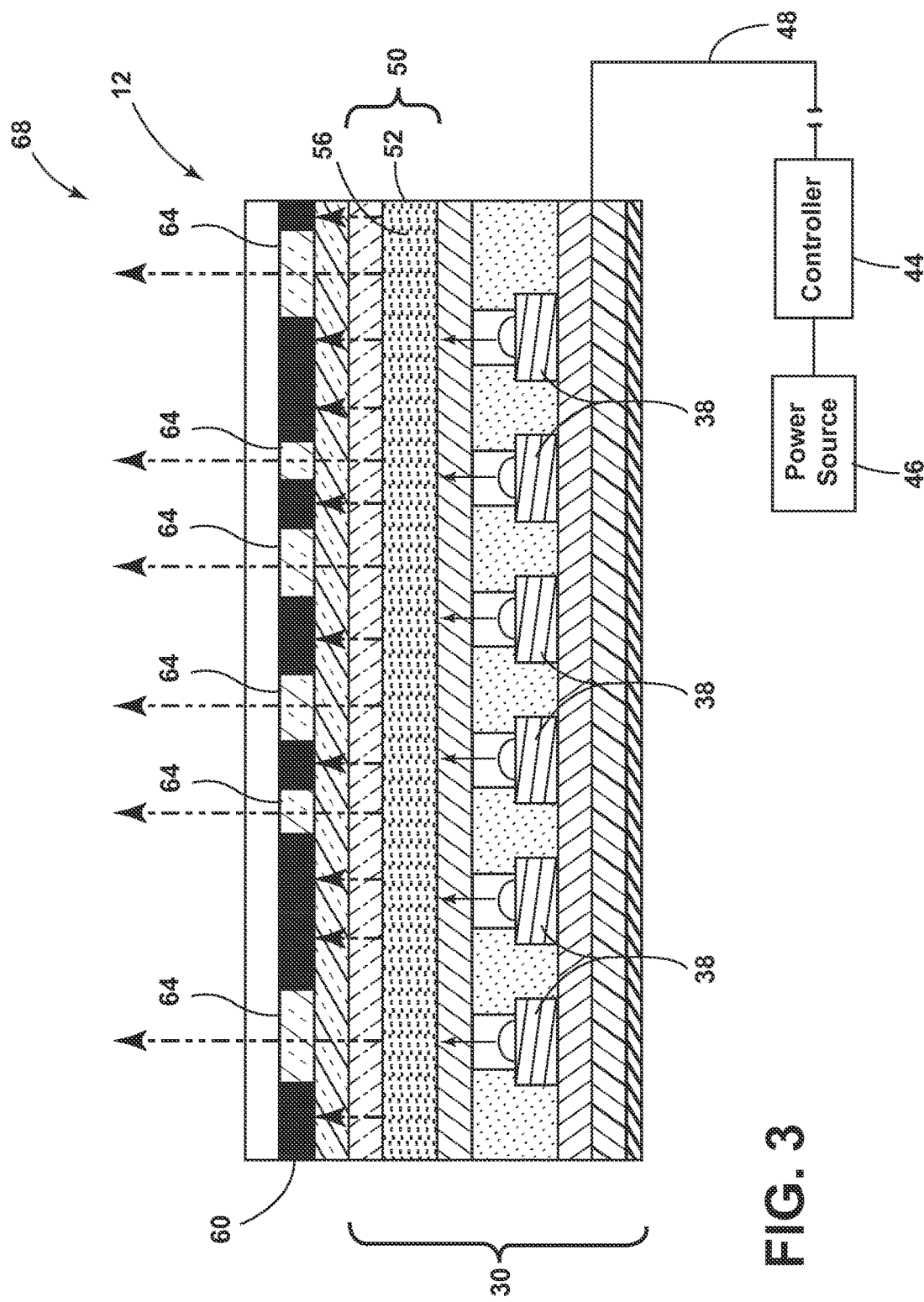
FIG. 3 illustrates an energy conversion process for generating a single color, according to one embodiment.

Referring to FIG. 3, an energy conversion process 68 for illuminating the decal 12 in a single color of light is illustrated according to one embodiment. For purposes of illustration, the energy conversion process 68 is described below with continued reference to the decal 12 depicted in FIG. 2. In the presently illustrated embodiment, the energy conversion layer 52 of the photoluminescent structure 50 includes only photoluminescent material 56, which is configured to convert inputted light (e.g., solid arrows) received from LED sources 38 into a visible light (e.g., broken arrows) having a wavelength different than that associated with the inputted light. The visible light is outputted from the decal 12 via the translucent ink 64 portions of the decorative layer 60 More specifically, the photoluminescent material 56 is formulated to have an absorption spectrum that includes the emission wavelength of the inputted light supplied from the LED sources 38. The photoluminescent material 56 is also formulated to have a Stokes shift resulting in the converted light having an emission spectrum expressed in a desired color, which may vary depending on the lighting application and is outputted from the decal 12 via the translucent ink 64 portions of the decorative layer 60. In one embodiment, the energy conversion process 68 is undertaken by way of down conversion, whereby the inputted light includes light on the lower end of the visibility spectrum such as blue, violet, or ultraviolet (UV) light. Doing so enables blue, violet, or UV LEDs to be used as the LED sources 38, which may offer a relative cost advantage over simply using LEDs of the desired color and foregoing the energy conversion process altogether. Furthermore, the resulting illumination of the decal 12 offers a unique and attractive viewing experience that may be difficult to duplicate through non-photoluminescent means.

In operation, the controller 44 may control the light emission intensity of the light-producing assembly 30 to ultimately affect the brightness in which the decal 12 illuminates. For example, the controller 44 may control the intensity of the LED sources 38 through pulse-width modulation or direct current control. Additionally or alternatively, the controller 44 may control the light emission duration of the LED sources 38 to affect the duration in which the decal 12 illuminates. For example, the controller 44 may activate all or a portion of the LED sources 38 for an extended duration such that at least a portion of the decal 12 exhibits sustained illumination. Alternatively, the controller 44 may flash all or a portion of the LED sources 38 at varying time intervals such that the decal 12 exhibits a blinking effect. In some embodiments, the controller 44 may activate certain portions of the LED sources 38 at different times to excite select portions of the photoluminescent structure 50. For example, the LED sources 38 may be operated to excite the photoluminescent structure 50 such that the decal 12 illuminates from one side to the other, from top to bottom, bottom to top, and the like. It should be appreciated that numerous illumination schemes are possible by manipulating the intensity and/or duration of all or a portion of the LED sources 38 of the light-producing assembly 30.

Figure 4:
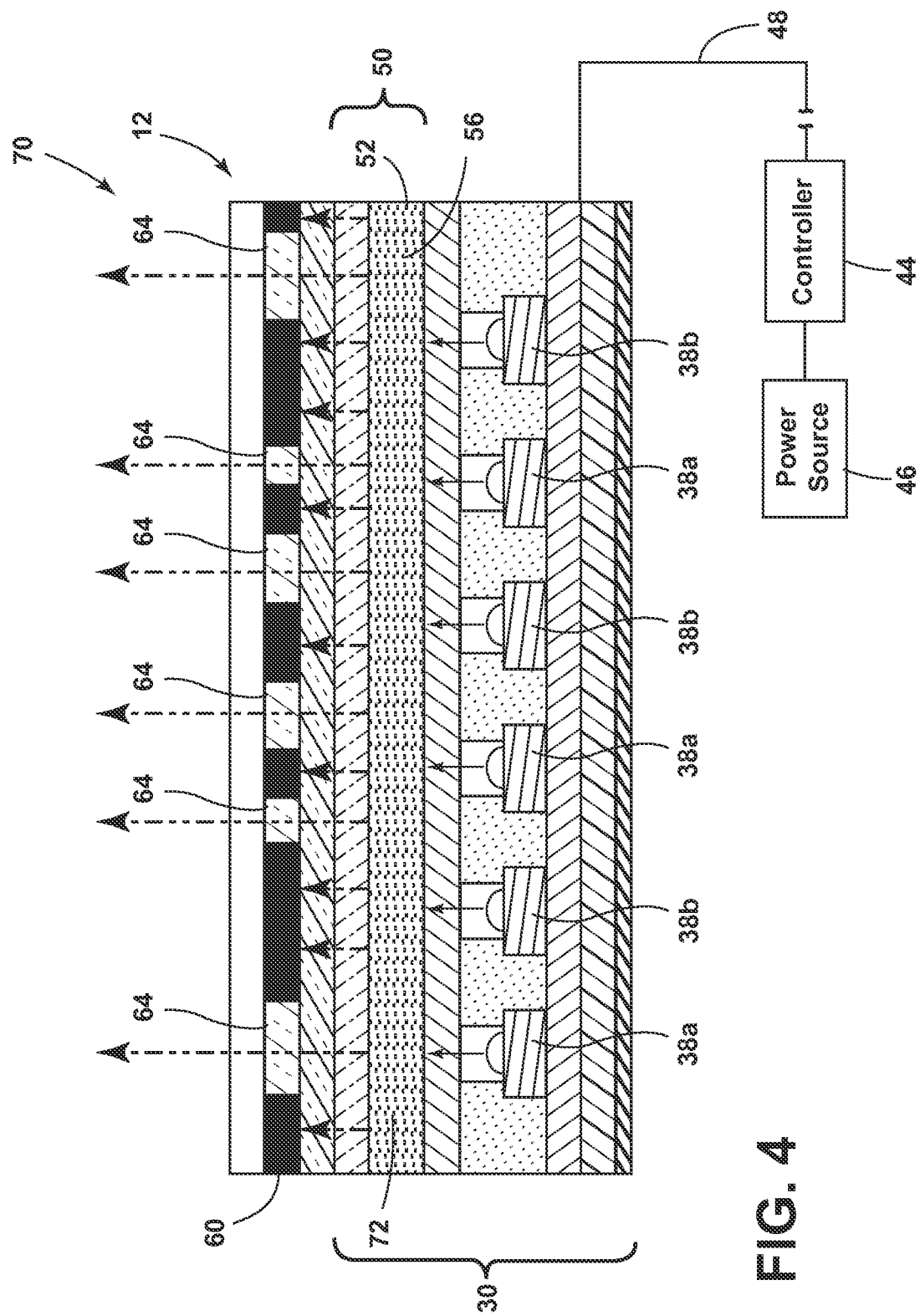
FIG. 4 illustrates an energy conversion process for generating one or more colors, according to one embodiment.

Referring to FIG. 4, an energy conversion process 70 for illuminating the decal 12 in one or more colors of light is illustrated according to one embodiment. For consistency, the energy conversion process 70 is also described below with continued reference to the decal 12 depicted in FIG. 2. In this embodiment, the energy conversion layer 52 includes two different photoluminescent materials 56, 72 that are interspersed within the energy conversion layer 52. Alternatively, the photoluminescent materials 56, 72 may be isolated from each other if desired. Also, it should be appreciated that the energy conversion layer 52 may include more than two different photoluminescent materials, in which case, the teachings provided below similarly apply. In one embodiment, energy conversion process 70 occurs by way of down conversion using blue, violet, and/or UV light as the source of excitation.

With respect to the presently illustrated embodiment, the excitation of photoluminescent materials 56 and 72 are mutually exclusive. That is, photoluminescent materials 56 and 72 are formulated to have non-overlapping absorption spectrums and Stoke shifts that yield different emission spectrums. Also, in formulating the photoluminescent materials 56, 72, care should be taken in choosing the associated Stoke shifts such that the converted light emitted from one of the photoluminescent materials 56, 72 does not excite the other, unless so desired. According to one exemplary embodiment, a first portion of the LED sources 38, exemplarily shown as LED sources 38a, is configured to emit an inputted light having an emission wavelength that only excites photoluminescent material 56 and results in the inputted light being converted into a visible light of a first color that is outputted from the decal 12 via the translucent ink 64 portions of the decorative layer 60. Likewise, a second portion of the LED sources 38, exemplarily shown as LED sources 38b, is configured to emit an inputted light having an emission wavelength that only excites photoluminescent material 72 and results in the inputted light being converted into a visible light of a second color that is also outputted from the decal 12 via the translucent ink 64 portions of the decorative layer 60. Preferably, the first and second colors are visually distinguishable from one another.

In operation, LED sources 38a and 38b may be controlled in any manner described previously with reference to LED sources 38 in FIG. 4. Additionally, LED sources 38a and 38b may be selectively activated using the controller 44 to cause the decal 12 to illuminate in a variety of colors. For example, the controller 44 may activate only LED sources 38a to exclusively excite photoluminescent material 56, resulting in the decal 12 illuminating in the first color. Alternatively, the controller 44 may activate only LED sources 38b to exclusively excite photoluminescent material 72, resulting in the decal 12 illuminating in the second color. Alternatively still, the controller 44 may activate LED sources 38a and 38b in concert, which causes both of the photoluminescent materials 56, 72 to become excited, resulting in the decal 12 illuminating in a third color, which is a color mixture of the first and second color. For energy conversion layers containing more than two distinct photoluminescent materials, a greater diversity of colors may be achieved. Contemplated colors include red, green, blue, and combinations thereof including white, all of which may be achieved by selecting the appropriate combinations of photoluminescent materials and LED sources.

Figure 5:
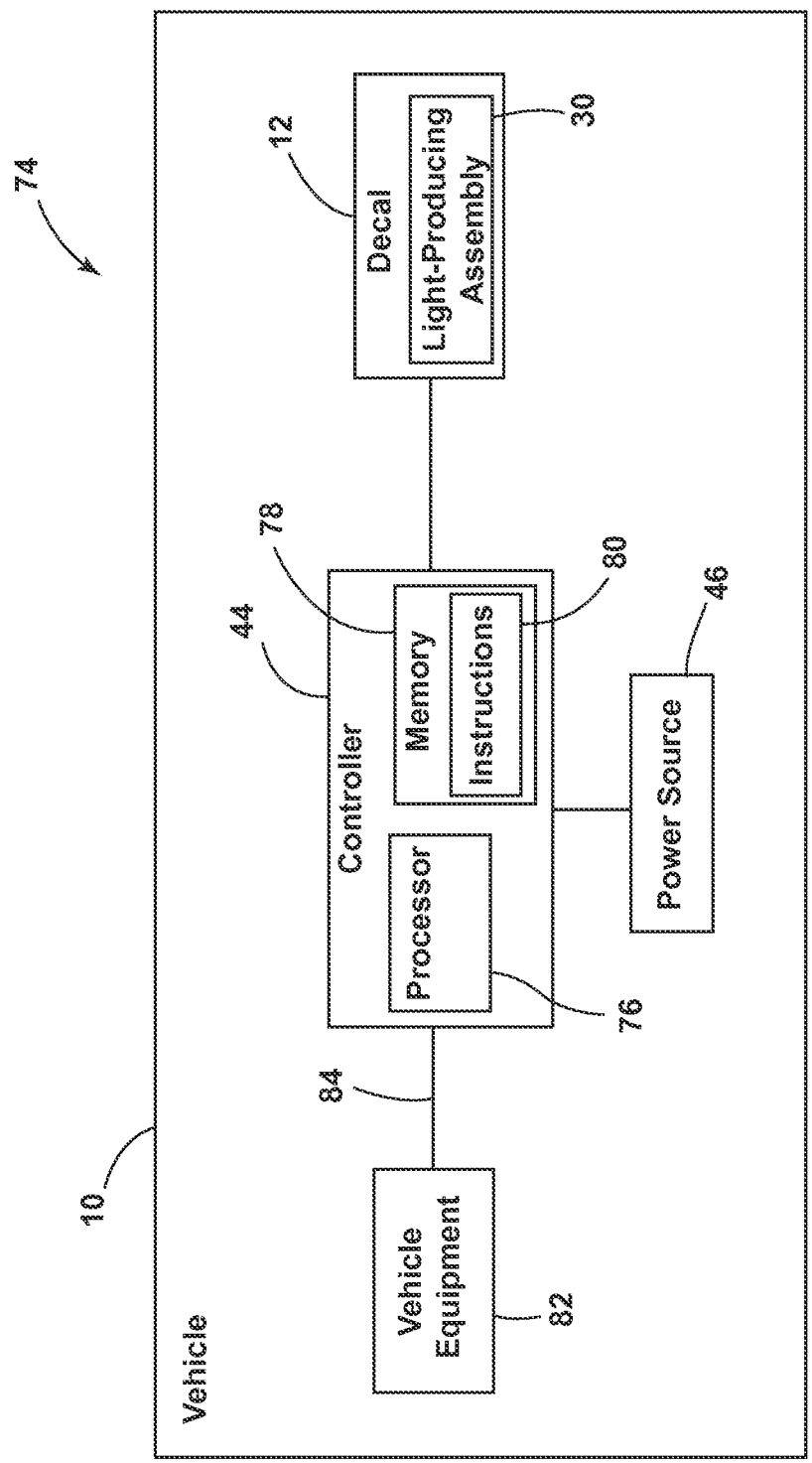
FIG. 5 is a block diagram of a vehicle lighting system employing the decal depicted in FIG. 1, according to one embodiment.

Referring to FIG. 5, a block diagram of a lighting system 74 is shown according to one embodiment with continued reference to the decal 12 shown in FIGS. 1 and 3. The decal 12 may employ one of the energy conversion processes 68, 70 depicted in FIGS. 4 and 5. That is, it is to be understood that the decal 12 may be configured to illuminate wholly or in-part in one or more colors. As shown and described previously herein, the controller 44 is electrically connected to the light-producing assembly 30 of the decal 12 and to the power source 46, which may correspond to a vehicular power source operating at 12 to 16 VDC. The controller 44 may be variously located within the vehicle 10 and includes a processor 76 in communication with a memory 78. The memory 78 includes instructions 80 stored thereon that are executable by the processor 76. The instructions 80 relate to controlling an activation state of the LED sources 38 of the light-producing assembly 30 and enable the controller 44 to selectively activate at least a portion of the LED sources 38. The controller 44 may be communicatively coupled to one or more vehicle equipment 82 and use signals received therefrom to control the activation state of the light-producing assembly 30 of the decal 12. The controller 44 may communicate with the one or more vehicle equipment 82 over a communication bus 84 of the vehicle 10 and may receive signals directed to a vehicle-related condition such as, but not limited to, an operational state of the vehicle 10, a status related to a particular vehicle equipment (e.g., door open status), a key fob proximity status, a remote signal sourced from a portable electronic device, a status related to an operating environment of the vehicle 10 (e.g., an ambient light level), or any other information or control signal that may be utilized to activate or otherwise adjust the output of the LED sources 38, thereby affecting the luminescence of the photoluminescent structure 50. It should be appreciated that the controller 44 may be connected to additional decals and configured to selectively activate each decal based on one or more vehicle-related conditions.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A decal comprising:
   a plurality of printed light emitting diodes (LEDs) directly coupled to an exterior body of a vehicle;
   a remote photoluminescent structure arranged over the plurality of printed LEDs and configured to luminesce in response to light excitation by at least a portion of the plurality of printed LEDs; and
   a decorative layer arranged over the remote photoluminescent structure and having a pattern that is at least partially illuminated by luminescent light.

2. The decal of claim 1, wherein the plurality of plurality of printed LEDs are arranged as printed LEDs and are coupled to the exterior body via an adhesive.

3. The decal of claim 2, wherein the remote photoluminescent structure comprises at least one photoluminescent material, wherein the at least one photoluminescent material is configured to down convert an inputted light received from at least a portion of the plurality of printed LEDs into a visible light.

4. The decal of claim 3, wherein the inputted light comprises one of a blue light, violet light, and a UV light.

5. The decal of claim 1, wherein the decorative layer comprises a light translucent portion and an opaque portion.

6. The decal of claim 1, further comprising a controller for controlling an activation state of the plurality of printed LEDs in response to at least one vehicle-related condition.

7. The decal of claim 6, wherein the controller determines at least one of a light emission intensity and a light emission duration of the plurality of printed LEDs.

8. A decal for a vehicle, comprising:
   a plurality of plurality of printed LEDs directly adhered to a visible vehicle surface;
   a remote photoluminescent structure arranged over the plurality of printed LEDs and configured to luminesce in response to light excitation by at least a portion of the plurality of printed LEDs; and
   a decorative layer arranged over the remote photoluminescent structure and having a pattern that is at least partially illuminated by luminescent light.

9. The decal of claim 8, wherein the remote photoluminescent structure comprises at least one photoluminescent material, wherein the at least one photoluminescent material is configured to down convert an inputted light received from at least a portion of the plurality of plurality of printed LEDs into a visible light.

10. The decal of claim 9, wherein the inputted light comprises one of a blue light, violet light, and a UV light.

11. The decal of claim 8, wherein the decorative layer comprises a light translucent portion and an opaque portion.

12. The decal of claim 8, further comprising a controller for controlling an activation state of the plurality of printed LEDs in response to at least one vehicle-related condition.

13. The decal of claim 12, wherein the controller determines at least one of a light emission intensity and a light emission duration of the plurality of printed LEDs.

14. A decal, comprising:
  printed LEDs directly adhered to an exterior surface of a vehicle;
  a remote photoluminescent structure arranged over the printed LEDs and configured to luminesce in response to light excitation by the printed LEDs;
  a decorative layer arranged over the remote photoluminescent structure and having a pattern that is at least partially illuminated by luminescent light; and
  a clear protective layer arranged over the decorative layer to protect the decal against environmental exposure.

15. The decal of claim 14, wherein the remote photoluminescent structure comprises at least one photoluminescent material, wherein the at least one photoluminescent material is configured to down convert an inputted light received from at least a portion of the printed LEDs into a visible light.

16. The decal of claim 15, wherein the inputted light comprises one of a blue light, violet light, and a UV light.

17. The decal of claim 14, wherein the pattern is defined using an opaque ink and a translucent ink.

18. The decal of claim 14, further comprising a controller for controlling an activation state of the printed LEDs in response to at least one vehicle-related condition.

19. The decal of claim 18, wherein the controller determines at least one of a light emission intensity and a light emission duration of the printed LEDs.

* * * * *

UNITED STATES PATENT AND TRADEMARK OFFICE
CERTIFICATE OF CORRECTION

PATENT NO.        : 9,688,186 B2
APPLICATION NO.   : 14/686156
DATED             : June 27, 2017
INVENTOR(S)       : Dellock et al.

It is certified that error appears in the above-identified patent and that said Letters Patent is hereby corrected as shown below:

In the Claims

Column 8

Claim 2, Lines 29-30:
Delete "plurality of printed".

Claim 8, Line 49:
Delete "of plurality".

Claim 9, Line 62:
Delete "of plurality".

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*